United States Patent
Cornic et al.

(10) Patent No.: US 7,903,023 B2
(45) Date of Patent: Mar. 8, 2011

(54) OBSTACLE DETECTION SYSTEM NOTABLY FOR AN ANTICOLLISION SYSTEM

(75) Inventors: Pascal Cornic, Saint Renan (FR); Patrick Le Bihan, Lannilis (FR); Yves Audic, Plouzane (FR); Philippe Lacomme, Igny (FR)

(73) Assignee: Thales (FR)

( * ) Notice: Subject to any disclaimer, the term of this patent is extended or adjusted under 35 U.S.C. 154(b) by 78 days.

(21) Appl. No.: 12/048,910

(22) Filed: Mar. 14, 2008

(65) Prior Publication Data

US 2009/0174591 A1  Jul. 9, 2009

(30) Foreign Application Priority Data

Mar. 16, 2007  (FR) .................................. 07 01927

(51) Int. Cl.
*G01S 13/08*  (2006.01)
(52) U.S. Cl. .......... 342/139; 342/118; 342/147; 342/149
(58) Field of Classification Search ............... 342/29
See application file for complete search history.

(56) References Cited

U.S. PATENT DOCUMENTS

| | | | | |
|---|---|---|---|---|
| 2,718,000 | A | * | 9/1955 | Sunstein ........................ 342/140 |
| 3,114,147 | A | | 12/1963 | Kuecken |
| 3,134,100 | A | | 5/1964 | Lakatos |
| 3,996,589 | A | * | 12/1976 | Breese ............................. 342/81 |
| 4,167,329 | A | * | 9/1979 | Jelalian et al. ................ 356/5.09 |
| 4,899,161 | A | * | 2/1990 | Morin et al. .................... 342/451 |
| 4,975,704 | A | * | 12/1990 | Gabriel et al. ................ 342/25 C |
| 5,495,249 | A | * | 2/1996 | Chazelle et al. ................. 342/36 |
| 5,818,383 | A | * | 10/1998 | Stockburger et al. .......... 342/109 |
| 5,831,570 | A | * | 11/1998 | Ammar et al. ............... 342/26 B |
| 6,118,401 | A | | 9/2000 | Tognazzini |
| 6,591,171 | B1 | * | 7/2003 | Ammar et al. ................... 701/16 |
| 2003/0016163 | A1 | * | 1/2003 | Isaji ................................ 342/70 |
| 2004/0113835 | A1 | * | 6/2004 | Jones et al. .................... 342/160 |
| 2005/0083227 | A1 | * | 4/2005 | Takano et al. .................... 342/70 |
| 2005/0128132 | A1 | | 6/2005 | Ziller et al. |

FOREIGN PATENT DOCUMENTS

DE  2327186  12/1974

(Continued)

*Primary Examiner* — Thomas H Tarcza
*Assistant Examiner* — Timothy A Brainard
(74) *Attorney, Agent, or Firm* — Lowe Hauptman Ham & Berner, LLP (57) ABSTRACT

The present invention relates to system for detecting obstacles (13, 55, 56, 57) on the ground (15) onboard a carrier (1). The detection system comprises at least two continuous-wave radars (2, 3, 4). The radars (2, 3, 4) are linked to a system (15) for utilizing the detection data arising from the radars (2, 3, 4). The detection system performs localization of an obstacle (13, 55, 56, 57): along a radial axis (12) between a radar (2, 3, 4) and the obstacle (13, 55, 56, 57), by calculating the distance between the radar (2, 3, 4) and the obstacle (13, 55, 56, 57); along a vertical axis (14) with respect to a radar (2, 3, 4), by calculating the elevation of the obstacle (13, 55, 56, 57) using monopulse deviation-measurement processing. The detection system performs localization of an obstacles along a horizontal axis (18) transverse with respect to a sighting axis (11) of a radar (2, 3, 4), by calculating the azimuthal position of the obstacle (13, 55, 56, 57). The invention applies notably in respect of the detection of obstacles on the ground so as to avoid any collision between a taxiing aircraft and these obstacles.

8 Claims, 4 Drawing Sheets

FOREIGN PATENT DOCUMENTS

| | | |
|---|---|---|
| DE | 19949409 A1 | 4/2001 |
| EP | 0915349 A1 | 5/1999 |
| EP | 1321776 A1 | 6/2003 |
| EP | 1726972 A1 | 11/2006 |
| EP | 1731921 A1 | 12/2006 |
| RU | 2150752 C1 | 6/2000 |
| WO | 2005/054895 A1 | 6/2005 |
| WO | 2007/028433 A1 | 3/2007 |

* cited by examiner

OBSTACLE DETECTION SYSTEM NOTABLY FOR AN ANTICOLLISION SYSTEM

RELATED APPLICATIONS

The present application is based on, and claims priority from, French Application Number 07 01927, filed Mar. 16, 2007, the disclosure of which is hereby incorporated by reference herein in its entirety.

FIELD OF THE INVENTION

The present invention relates to an obstacle detection system for an anticollision system notably for a taxiing aircraft. The invention applies notably in respect of the detection of obstacles on the ground in order to avoid any collision between a taxiing aircraft and these obstacles.

BACKGROUND OF THE INVENTION

The density of airport traffic is ever greater both in the air and on the ground. Collisions between aircraft and various obstacles on the ground are ever more frequent, notably when an aircraft attains a parking position from an airport landing runway. For example, on a wide-bodied aircraft, it is hard for the pilot of the aircraft to see the wings and engines. The wings and engines are therefore particularly exposed to impacts with various objects such as:
- other aircraft;
- airport installations;
- technical vehicles of the airport.

This type of incident, in addition to the costs of repairing the aircraft, gives rise to the grounding of the aircraft. This grounding of the aircraft is financially prejudicial to the company owning this aircraft.

To alleviate these collision problems, airports are furnished with various means allowing centralized management of the traffic on the ground. These means are notably airport monitoring radars, radio means, GPSs and transponders. However, the density of the traffic on the airports is such that these means are insufficient to ensure the final guidance of aircraft towards their parking position. Moreover these means are often ineffective in foggy weather for example and generally when the meteorological conditions are bad or at nightfall. Human intervention is then necessary in order to avoid any risk of the aircraft colliding with objects present on the ground in a taxi zone.

Another way to avoid collisions between an aircraft and objects present on the ground is to equip the aircraft with autonomous anticollision devices complementary to the means existing at the airport. These anticollision devices make it possible notably to ensure the protection of the aircraft over a very short distance in relation to objects that are fixed or possess a low speed of movement.

Among these means, devices comprising cameras are notably used. Cameras are, however, ineffective with poor meteorological conditions. Moreover, devices based on cameras do not provide the pilot with accurate information either on the distance between the aircraft and a potential obstacle, or on the relative speed of the aircraft with respect to the obstacle. To process a wide angular domain with a sufficient depth of field in a very short time, cameras can be equipped with zooms or fast electronic pointing devices. Cameras thus equipped are complex to implement and do not possess the reliability necessary for an anticollision device.

Other devices based on LIDAR, standing for Light Detection And Ranging, can be used. Anticollision devices using LIDAR have, however, the same drawbacks as devices using cameras.

Acoustic sensors can also be implemented in anticollision devices. Acoustic sensors are, however, very sensitive to jamming and to disturbances in the propagation of acoustic waves. All this makes it difficult to employ acoustic sensors in an airport environment. The range of the acoustic sensors is also too low, of the order of a few meters, to be suitable for an anticollision device.

Other anticollision devices use radar technologies such as ultra wideband radars. These devices risk jamming other equipment such as the navigation equipment on board the aircraft. Ultra wideband radars are therefore subject, when their use is permitted, to very restrictive regulation limiting notably the power of the emitted wave. The limitation of the emission power of these radars considerably reduces their domain of use and notably their range. Moreover, these radars do not possess, taken individually, any angular discrimination capability. They therefore do not allow sufficiently accurate location of obstacles. Such radars possess beneficial angular discrimination capabilities only when they are grouped into arrays of large dimension, this being impossible to implement onboard an aircraft.

SUMMARY OF THE INVENTION

An aim of the invention is notably to alleviate the aforesaid drawbacks. For this purpose, the subject of the invention is a system for detecting obstacles on the ground onboard a carrier. The detection system comprises at least two continuous-wave radars. The radars are notably linked to a system for utilizing the detection data arising from the radars. The detection system performs localization of an obstacle:
- along a radial axis between a radar and the obstacle, by calculating the distance between the radar and the obstacle;
- along a vertical axis with respect to a radar, for example by calculating the elevation of the obstacle using notably monopulse deviation-measurement processing;
- along a horizontal axis transverse with respect to a sighting axis of a radar, by calculating the azimuthal position of the obstacle.

The radar can measure the distance between the radar and the obstacle by frequency modulation of the wave emitted by the radar, for example on a frequency band of 50 MHz to 300 MHz.

The radar can measure the azimuthal position of the obstacle by SAR processing.

The radar can measure the azimuthal position of the obstacle by Doppler filtering.

A calculation of the speed of the carrier can be performed by processing a Doppler spectrum obtained on the basis of at least two beams of at least two radars. The two beams are for example concurrent and illuminate one and the same part of the ground.

A calculation of the speed of the carrier can be performed by processing a Doppler spectrum obtained on the basis of at least two beams of at least two radars. The two beams are for example directed towards the ground while having different sighting axes.

The focal length of a radar can be adjusted as a function of a domain to be illuminated.

The carrier is for example an aircraft.

The main advantages of the device according to the invention are notably that it is easy to integrate onboard an aircraft at reduced cost, while having high-resolution imaging capability making it possible to detect obstacles on the ground very rapidly.

BRIEF DESCRIPTION OF THE DRAWINGS

Other characteristics and advantages of the invention will be apparent with the aid of the description which follows, given by way of nonlimiting illustration, and offered in relation to the appended drawings which represent.

DETAILED DESCRIPTION OF A PREFERRED EMBODIMENT

Figure 1:
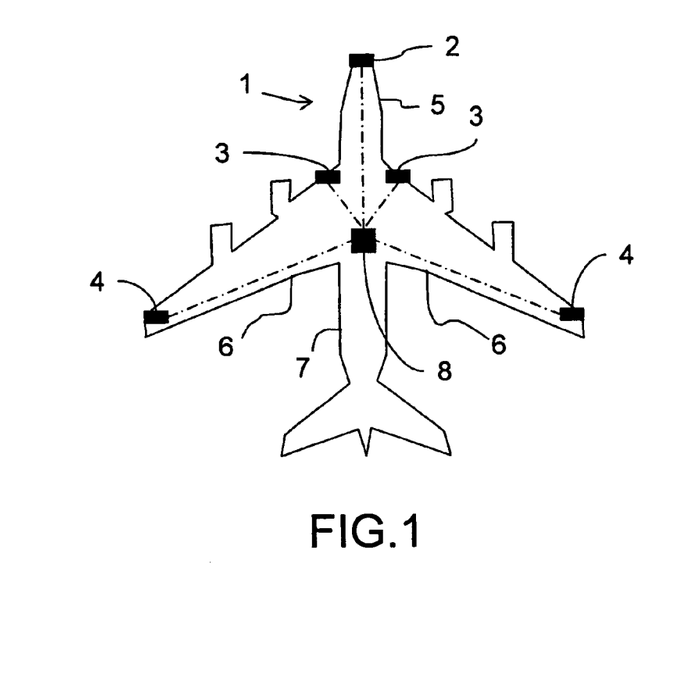
FIG. 1: an exemplary installation of a radar array according to the invention on an aircraft.

FIG. 1 represents an aircraft 1 equipped with sensors 2, 3, 4 according to the invention. The sensors 2, 3, 4 are continuous millimetric wave radars. The continuous waves allow the radars 2, 3, 4 to emit and to receive simultaneously. This makes it possible to have no blind zone during detection. The radars 2, 3, 4 emit for example at a frequency of the order of 70 GHz. The radars 2, 3, 4 form a sensor array. The radars 2, 3, 4 are additionally linked to a detection data processing system 8. Thanks to the detection data originating from the various radars 2, 3, 4, the data processing system 8 can produce a synthetic and dynamic image of the environment of the aircraft 1. This synthetic image is an overall view of the situation in the environs of sensitive parts of the aircraft 1 such as the wings 6. This view can comprise fixed obstacles and also obstacles possessing a low speed of movement. The synthetic image is thereafter presented to the pilot of the aircraft 1 so that he can undertake an obstacle avoidance maneuver if necessary.

FIG. 1 exhibits an example of several possible positions for the radars 2, 3, 4. Each position can accommodate one or more radars. A single radar per position is represented in FIG. 1. The various positions of the radars 2, 3, 4 are as follows:
a first radar 2 can be situated in the nose 5 of the aircraft 1;
a second radar 3 can be located at each intersection notably front between a wing 6 and a fuselage 7 of the aircraft 1;
a third radar 4 can be positioned on the tip of each wing 6 of the aircraft 1.

The millimetric wave radars 2, 3, 4 possess a reduced size which facilitates their installation on an aircraft.

Figure 2A:
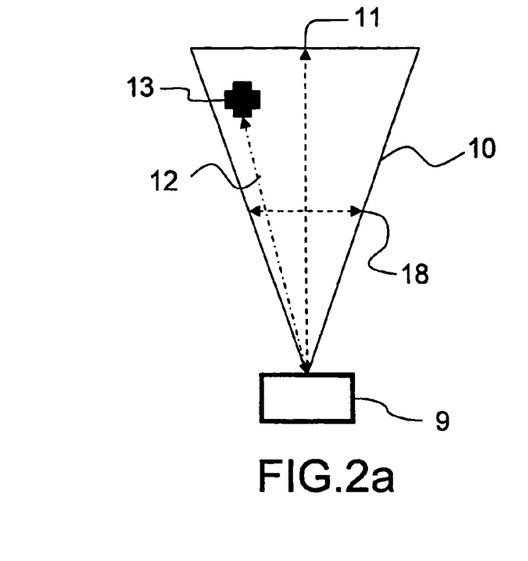
FIG. 2a: a schematic view from above of an elementary radar of the radar array according to the invention.
Figure 2B:
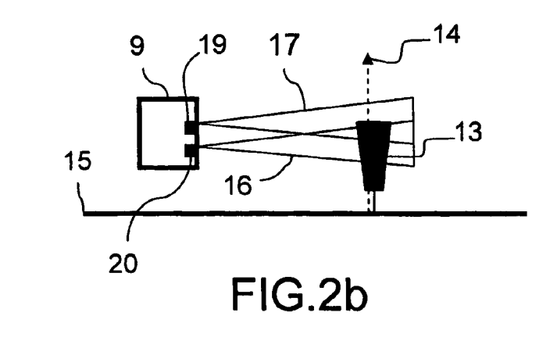
FIG. 2b: a schematic profile view of the elementary radar.

FIGS. 2a and 2b represent in a schematic manner a millimetric wave radar 9 as well as its horizontal coverage domain 10. The radar 9 is an example of an elementary radar 9 used in a sensor array 2, 3, 4. Good resolution of the measurements performed by the elementary radar 9 is obtained by performing the processings described subsequently according to various measurement axes.

According to a radial axis 12 between the elementary radar 9 and an obstacle 13 represented in FIG. 2a: a frequency modulation of the wave emitted by the elementary radar 9 on a frequency band going for example from 50 MHz to 300 MHz is associated with a processing, well known to the person skilled in the art, of the signal received in response to the emitted wave. These processings make it possible to obtain good accuracy in the measurement of a radial distance between the obstacle 13 and the elementary radar 9.

According to a vertical axis 14 represented in FIG. 2b: a measurement of the height of the obstacle 13 with respect to the ground 15 can be obtained by monopulse deviation-measurement processing, by using notably at least two first emission beams 16, 17 of the elementary radar 9. Each first beam 16, 17 arises from a detection source 19, 20 of the radar 9. The sources 19, 20 of the first two beams 16, 17 are for example situated one above the other in a vertical plane. A measurement of the height of the obstacle 13 can amount to a calculation of the elevation of a top part of the obstacle 13 for example.

According to a horizontal axis 18 perpendicular to a sighting axis 11 of the elementary radar 9 represented in FIG. 2a: SAR processing, standing for Synthetic Aperture Radar, makes it possible to obtain a resolution for a measurement of the azimuthal position of the obstacle 13 that is less than a meter. Processing by simple Doppler filtering also makes it possible to obtain very good results for the measurement of the azimuthal position of the obstacle 13.

The association of the use of a millimetric wave radar 9 with the above-described processings advantageously makes it possible to have a coverage domain that is sufficiently extensive for the sensor array 2, 3, 4 to use a small number of elementary radars 9. The radars device according to the invention also possesses discrimination capability allowing good accuracy in the location of an obstacle 13.

Figure 3A:
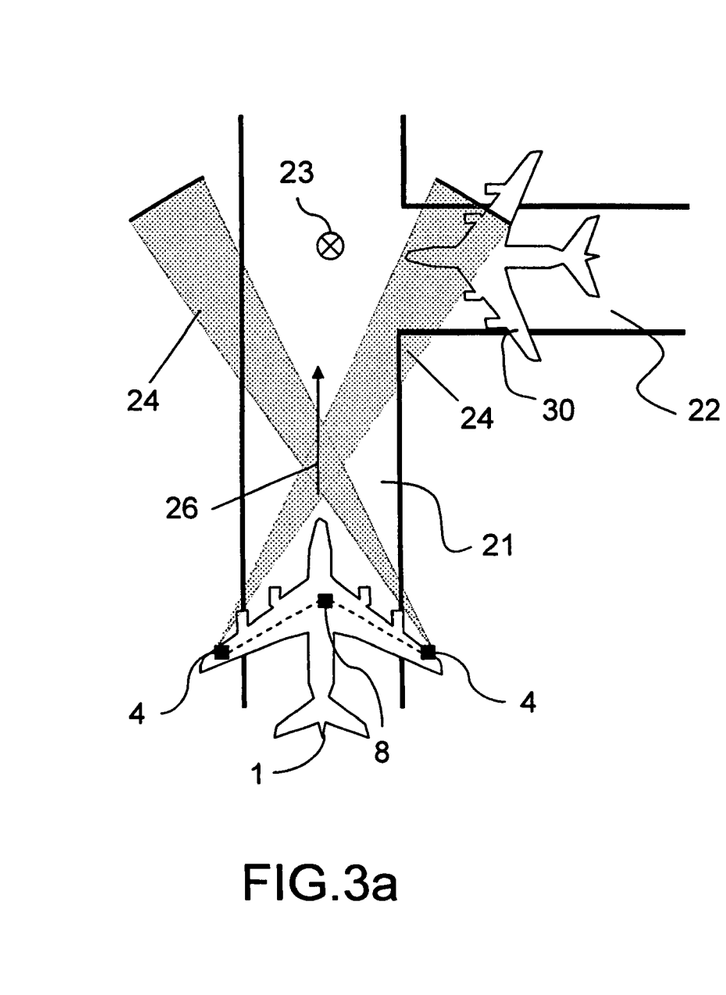
FIG. 3a: a first exemplary implementation of the radar array according to the invention on an aircraft.
Figure 3B:
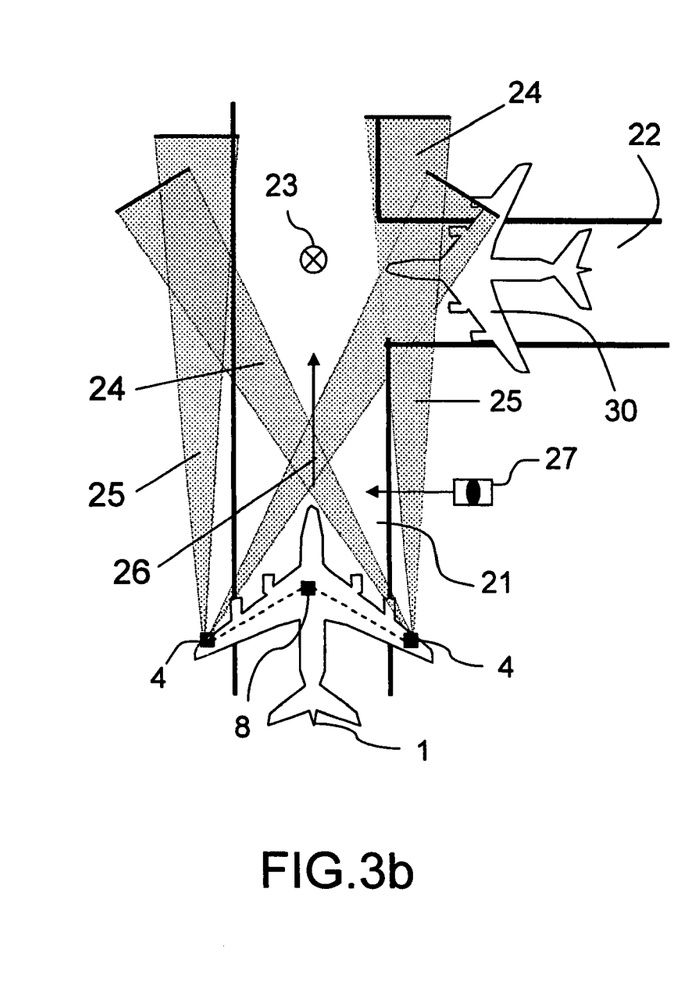
FIG. 3b: a second exemplary implementation of the radar array according to the invention on the aircraft.
Figure 3C:
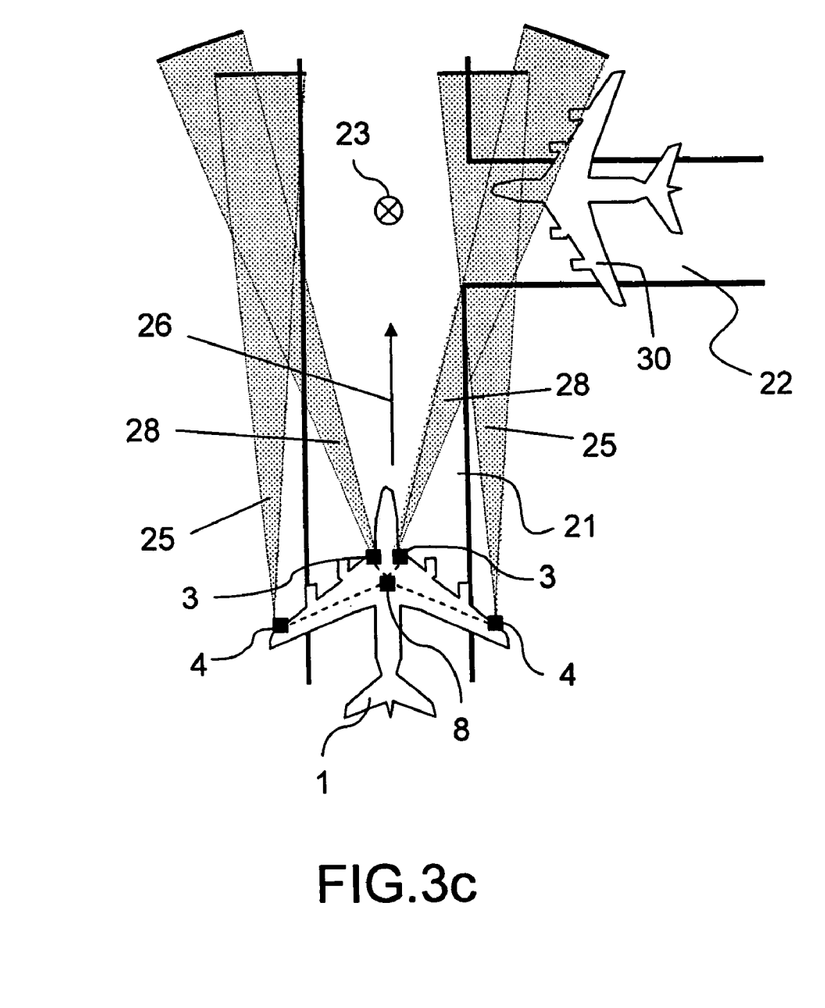
FIG. 3c: a third exemplary implementation of the radar array according to the invention on the aircraft.

FIGS. 3a, 3b and 3c represent several examples of possible installations of elementary radars 9 according to the invention. In each of FIGS. 3a, 3b and 3c, are represented:
the aircraft 1 taxiing on a first runway 21, the aircraft 1 being equipped with the sensor array 2, 3, 4 according to the invention, the aircraft 1 moving along an axis of movement 26 notably parallel to the first runway 21;
another aircraft 30 taxiing on a second runway 22 for example perpendicular to the first runway 21;
a sensor array 2, 3, 4 according to the invention comprising at least one detection data processing system 8 and at least two sensors 3, 4.

The aircraft 1 and the other aircraft 30 move towards one and the same point 23, this movement being liable to give rise to a collision between the two aircraft 1, 30.

FIG. 3a represents a first example of a first sensor array 4 according to the invention. The first sensor array 4 comprises for example at least two third radars 4. The third radars 4 are elementary radars 9, such as represented in FIGS. 2a and 2b. The third radars 4 are arranged on the end of each of the two wings of the aircraft 1. Each third radar 4 can use a second narrow detection beam 24, having an aperture of the order of about ten degrees in azimuth. The second beam 24 of each third radar 4 is for example oriented in such a way that the second beams 24 of each third radar 4 cross in front of the aircraft 1. The second beams 24 can be oriented so as to cover the whole of the first runway 21 and of direct environs of the runway 21 over a width corresponding at least to the width of the aircraft 1 in the course of the movement of the aircraft 1. This configuration of the third radars 4 and the orientation of the second beams 24 allows detection that ensures not only protection of the ends of the wings of the aircraft 1 but also protection of the engines and nose of the aircraft 1.

This type of arrangement of the third radars 4 advantageously uses a reduced number of sensors. The arrangement of the third radars 4 makes it possible moreover to cover a detection domain sufficient for the protection of the aircraft 1 without using electronic or mechanical scanning. This arrangement of the third radars 4 therefore allows the implementation of simple detection methods. Notably, this arrangement makes it possible, by the crossing of the second beams 24, to implement a processing for example of SAR type making it possible to improve the angular resolution of the detection by a Doppler separation method.

The configuration, represented in FIG. 3a, of the third radars 4 makes it possible to ensure the protection of the aircraft 1 in taxiing phases, for example just after landing or just before takeoff. During these phases, the aircraft 1 moves mainly in a straight line on the runway 21. This therefore involves protecting mainly the ends of the wings of the aircraft 1 from possible collisions with other airplanes, runway vehicles, signposts or lighting pylons situated at the boundary of the runway 21. The configuration, presented in FIG. 3a, of the third radars 4 is particularly suitable when the relative speed of the aircraft 1 with respect to potentially encountered obstacles is sufficiently large, of the order of several ten of knots.

The range of the third radars 4 can be adjusted so as to take into account dynamic constraints related to the movement of the aircraft 1 during the taxiing phases. These dynamic constraints can be for example, the speed of the aircraft, as well as the distance required by the aircraft 1 to stop in the event of emergency braking. These constraints can notably enable a safety distance to be defined between the aircraft 1 and a possible obstacle.

Estimation of the instantaneous speed of the aircraft 1 bearing two second radars 3 can also be made. A Doppler processing of a ground echo obtained on the basis of detection signals originating from the two second radars 3 allows accurate measurement of the instantaneous speed of the aircraft 1. Estimation of the speed can therefore be obtained on the basis of the Doppler spectrum measured with the aid of at least two sensors having different sighting axes. The Doppler spectrum can also be measured with the aid of at least two sensors having crossed beams and illuminating one and the same portion of the ground. The calculated speed of the aircraft 1 can make it possible to calibrate the various radars 2, 3, 4 of the sensor array according to the invention so as notably to adjust their range. Specifically, the lower the speed, the more it will be sought to locate obstacles close to the aircraft in a very wide detection field.

In the same manner, a measurement of a drift in the trajectory of the aircraft with respect to the center of the runway 21 for example can be performed by Doppler processing. In another use, detection of the distance of the aircraft with respect to the edge of the runway can be used to effect runway edge tracking.

FIG. 3b represents a second example of a second sensor array 4 according to the invention. The second array of third radars 4 reuses the first array of third radars 4, supplemented with at least two new third radars 4 each being situated at the tip of a wing of the aircraft 1 for example. The new third radars 4 have a third detection beam 25 directed along an axis 26 of movement of the aircraft 1. The new third radars 4 possess the same characteristics as the third radars 4 represented in FIG. 3a. The orientation of at least two third detection beams 25 along the direction of movement of the aircraft 1 makes it possible to detect a vehicle 27 entering for example the runway 21 at a distance from the aircraft 1 that is less than the previously defined safety distance. This vehicle 27 is not detected by the first array of third radars 4, the vehicle being situated sufficiently far from the runway 21. By adding the two new third radars 4 at the tip of the wings whose third detection beams 25 are directed along the axis of movement 26 of the aircraft 1, the detection of a vehicle 27 penetrating the runway laterally with respect to the axis of movement of the aircraft 1 can occur more rapidly. The detection of the other aircraft 30 is still ensured by the second sensor array 4 according to the invention.

FIG. 3c represents a third sensor array 3, 4. The third sensor array 3, 4 comprises at least two third radars 4 situated notably at the tip of the wings of the aircraft 1 and at least two second radars 3 situated for example at a front intersection between each wing of the aircraft 1 and its fuselage. The third beams 25 of the third radars 4 are directed along the axis of movement 26 of the aircraft 1. Each of the fourth detection beams 28 of the sensors 3 is directed so as to cross a third beam 25 of a third radar 4 situated on the same side of the aircraft 1 as the second radar 3. The intersections of the third and fourth beams 25, 28 are therefore situated on either side of the axis 26 of movement of the aircraft 1.

This third sensor array 2, 3, 4 makes it possible to obtain discrimination important for the detection of obstacles possibly situated on the edges of the runway 21 such as the other aircraft 30 for example.

Other configurations of sensor array 3, 4 are possible, they can for example combine the configurations of the first and of the third sensor array 3, 4. The advantage of performing a crossing of the various beams 24, 25, 28 of the sensors 3, 4 is to obtain better detection accuracy by correlating the detection information gathered by each sensor 3, 4.

Figure 4:
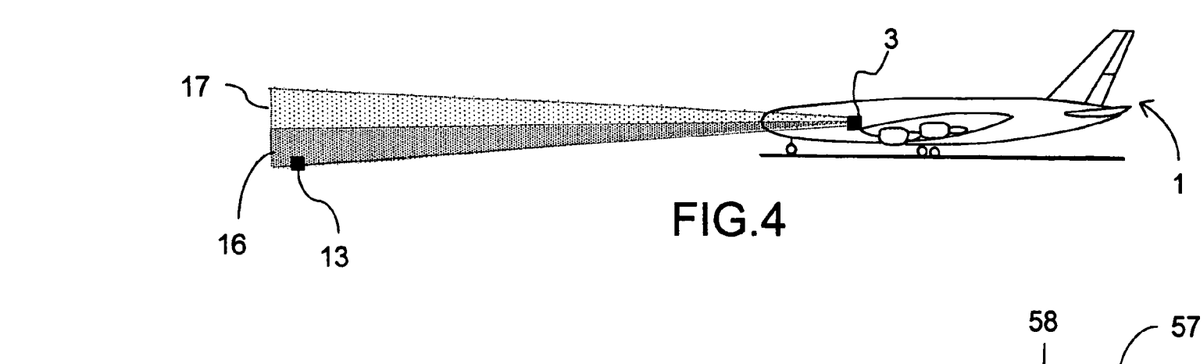
FIG. 4: two detection beams of the elementary radar carried by the aircraft for an elevation calculation.

FIG. 4 represents the aircraft 1 provided with a second radar 3 placed for example at a front junction between the fuselage of the aircraft 1 and a wing of the aircraft 1. The second radar 3 is notably a millimetric wave radar 9 as represented in FIGS. 2a, 2b. The second radar 3 therefore has at least two detection beams 16, 17 overlapping. The two beams 16, 17 make it possible to form detection pathways making it possible to implement conventional deviation-measurement processing. The aperture of the first beams 16, 17 can be five degrees in elevation for example.

The deviation-measurement processing performed by means of the detection information of the first two beams 16, 17 allows elevational angular location of a possible obstacle 13. This therefore makes it possible to determine the height of the obstacle 13. Given the template of the aircraft 1, the measurement of the height of the obstacle 13 makes it possible to decide whether or not there may be a collision between the aircraft 1 and the obstacle 13. The obstacle 13 may possibly pass under the wings of the aircraft 1 so no risk of collision is involved.

Figure 5:
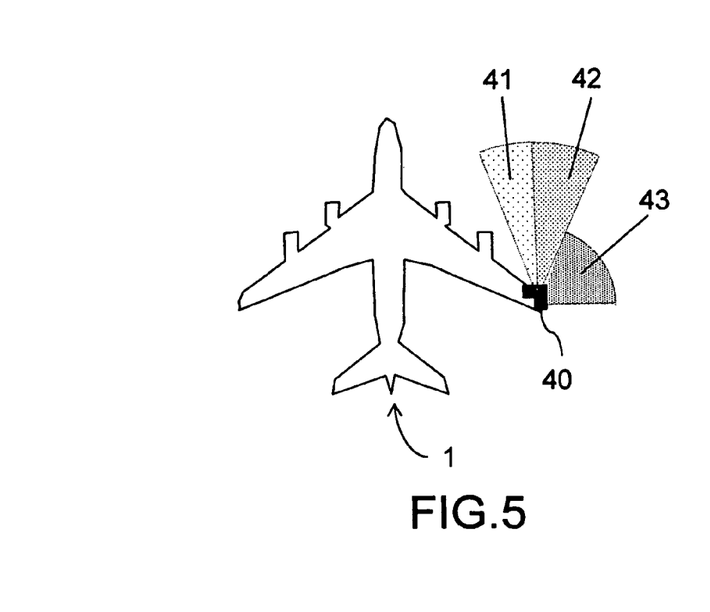
FIG. 5: an exemplary implementation of a radar array situated at the tip of a wing of the aircraft.

FIG. 5 represents an example of a first sensor sub-array 40 placed at the wing tip of the aircraft 1. Three fourth radars 40 can be placed at the tip of the wing of the aircraft 1. Out of these three fourth radars 40, two radars can be second radars 4 as described in FIGS. 3a, 3b, 3c. The second radars 4 ensure frontal protection of the aircraft 1. The two second radars 4 have for example detection domains 41, 42 possessing a long range so as to make the movements of the taxiing aircraft 1 secure as described previously. At least one other radar 40 can be associated with the second radars 4. The other radar 40 can be a radar with wider detection field and shorter range than the second radars 4. The other radar 40 can thus make it possible to protect the aircraft 1 in the course of maneuvers performed by the aircraft 1 at very low speed. These maneuvers at very low speed can be executed by the aircraft when it reaches its parking point for example. The speed of the aircraft 1 during maneuvers of this type is of the order of 15 knots. The range of the other radar 40 is then for example some thirty meters, with an angular aperture in azimuth of about forty degrees for example. The aperture in elevation of the other radar 40 is a few degrees, for example eight degrees. The other radar 40 is of the same type as the elementary radar 9, only the focal length of the antenna of the other radar 40 is tailored to the desired detection domain 43. The detection processings performed by the other radar 40 are the same as those described previously.

The sensor array 2, 3, 4 according to the invention therefore makes it possible to suit the detection capabilities to various situations in a simple manner, the various types of detection being ensured by the same elementary radars 9 having a suitable parameterization.

Figure 6:
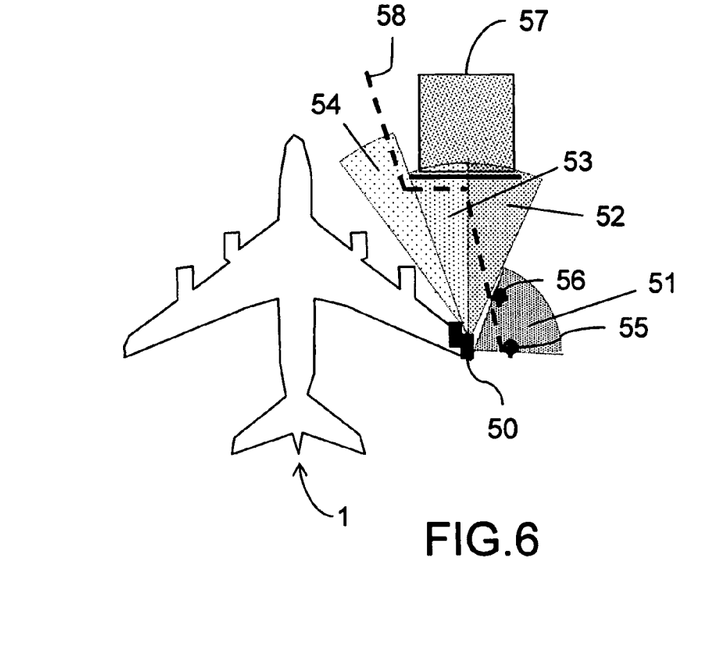
FIG. 6: an exemplary use of the radar array according to the invention.

FIG. 6 represents an exemplary conflict situation and the implementation of a configuration of a sensor array according to the invention installed on the aircraft 1. Only one second sub-array 50 is represented in FIG. 6. The second sub-array 50 comprises notably four elementary radars 9. Each elementary radar 9 is parameterized so as to cover a particular detection domain. Thus in FIG. 6 are represented four detection domains 51, 52, 53, 54. Each detection domain 51, 52, 53, 54 represented is associated with an elementary radar 9. Thus the elementary radar 9 associated with the first detection domain 51 possesses for example a short range with a wide detection field. The elementary radars 9 associated with the second and third detection domains 52, 53 possess for example a medium range with respect to the elementary radar 9 associated with the first detection domain 51. The elementary radar 9 associated with the fourth detection domain 54 is a radar having a long range with respect to the elementary radar 9 associated with the first detection domain 51.

Three obstacles 55, 56, 57 detected by the second sub-array 50 of sensors are represented in FIG. 6. A first and a second obstacle 55, 56, represented in a pointlike manner, can be lighting pylons or signposts. A third obstacle 57 is an obstacle of larger size such as an airport infrastructure. The first and second obstacles 55, 56 close to the tip of the right wing of the aircraft 1 are detected by the elementary radar 9 associated with the first detection domain 51. The third obstacle 57 is detected by the elementary radars 9 associated with the second and third detection domains 52, 53. For example, the result of the detection of the first, second and third obstacles 55, 56, 57 can enable the detection data processing system 8, represented in FIG. 1, to formulate a curve 58 delimiting a safety zone around the first, second and third obstacles 55, 56, 57. This curve 58 results from merging the information arising from the radars of the second sensor sub-array 50. The various points of the curve 58 are notably calculated as a function:

of the distance between an obstacle and the aircraft;
of the closing speed between the airplane and the obstacle.
The information regarding obstacle-aircraft distance and obstacle-aircraft relative speed arises out of the detection information. The curve 58 can notably be displayed on a control screen, which can be situated in the flight deck of the aircraft 1. This makes it possible to present the situation of the aircraft 1 with respect to the obstacles 55, 56, 57 to a pilot of the aircraft 1 so that he takes possible safety measures such as emergency braking or avoidance, if the situation seems to him to be critical.

The number of radars in the sensor array 2, 3, 4 according to the invention is not limited: it is a matter, with the sensor array according to the invention, of covering a detection domain sufficient to effectively protect the sensitive parts of the aircraft 1. In the same manner, the locations on the aircraft 1 of the radars of the sensor array according to the invention can be different from those represented in FIGS. 1, 3a, 3b, 3c, 4, 5, 6. The locations of the radars 2, 3, 4 can depend notably on the structure of the aircraft 1 or the position of each part to be protected on the aircraft 1.

The invention can also apply to any other type of carrier moving on the ground.

The radars used in the sensor array according to the invention advantageously possess reduced dimensions, a low weight and advantageously consume little energy. The radar device according to the invention is effective with a reduced number of sensors 2, 3, 4. All this makes it possible to integrate the sensor array 2, 3, 4 easily on an aircraft 1.

The radars 2, 3, 4 used in the detection system according to the invention have an extensive detection field. Accurate pointing of the radar beams is therefore not necessary. This advantageously affords the device according to the invention great flexibility of implementation.

One and the same type of elementary radar 9 according to the invention can use different focal lengths so as to cover the whole of the domain to be protected in association with several other elementary radars 9.

The device according to the invention is advantageously autonomous. Specifically, the device makes it possible notably to calculate the speed of the carrier with respect to the ground and thus parametrize the radars 2, 3, 4 of the device.

The use of the Doppler location method advantageously induces a very low detection time for an obstacle.

The use of millimetric wave radar 9 allows the device according to the invention to have a good discrimination capability.

Moreover, the advantageous use of GaAs, standing for Gallium Arsenide, or GeSi, standing for Germanium Silicon, technologies suited to the mass production of radars advantageously makes it possible to reduce the unit cost thereof.

The invention claimed is:

1. A system for detecting obstacles on the ground onboard a carrier, comprising:
    at least two continuous-wave radars, linked to a system for utilizing the detection data arising from the radars, each radar configured to perform localization of an obstacle:
        along a radial axis between the radar and the obstacle, by calculating the distance between the radar and the obstacle; and
        along a horizontal axis transverse with respect to a sighting axis of the radar, by calculating the azimuthal position of the obstacle; and
    wherein the system is configured to perform localization of an obstacle along a vertical axis by calculating the elevation of the obstacle using monopulse deviation measurement processing of data from the at least two continuous-wave radars.

2. The detection array as claimed in claim 1, wherein the radar is configured to measure the distance between the radar and the obstacle by frequency modulation of the wave emitted by the radar on a frequency band of 50 MHz to 300 MHz.

3. The detection system as claimed in claim 1, wherein the radar is configured to measure the azimuthal position of the obstacle by SAR processing.

4. The detection system as claimed claim 1, wherein the radar is configured to measure the azimuthal position of the obstacle by Doppler filtering.

5. The detection system as claimed in claim 1, wherein the detection system is configured to calculate the speed of the carrier by processing a Doppler spectrum obtained on the basis of at least two beams of at least two radars, the two beams being concurrent and illuminating one and the same part of the ground.

6. The detection system as claimed in claim 1, wherein the detection system is configured to calculate the speed of the carrier by processing a Doppler spectrum obtained on the basis of at least two beams of at least two radars, the two beams being directed towards the ground and having different sighting axes.

7. The detection system as claimed in claim 1, wherein the focal length of at least one of the radars is adjusted as a function of a domain to be illuminated.

8. The detection system as claimed in claim 1, wherein the carrier is an aircraft.

* * * * *